United States Patent [19]

Jordan et al.

[11] 4,164,460

[45] Aug. 14, 1979

[54] SYSTEM FOR THE DIELECTROPHORETIC SEPARATION OF PARTICULATE AND GRANULAR MATERIALS

[75] Inventors: Cy E. Jordan; Casimir P. Weaver, both of Tuscaloosa, Ala.

[73] Assignee: The United States of America as represented by the Secretary of the Interior, Washington, D.C.

[21] Appl. No.: 896,873

[22] Filed: Apr. 17, 1978

Related U.S. Application Data

[62] Division of Ser. No. 759,202, Jan. 13, 1977.

[51] Int. Cl.² .......................... B03C 5/00; B03C 7/06
[52] U.S. Cl. .............................. 204/180 R; 204/1 R; 204/186; 204/300 R
[58] Field of Search .................. 204/180 R, 186, 1 R, 204/213, 149, 299, 300 R

[56] References Cited

U.S. PATENT DOCUMENTS

| | | | |
|---|---|---|---|
| 2,406,820 | 9/1946 | Fisher et al. | 204/300 R X |
| 2,448,848 | 9/1948 | Van Loenen | 204/300 R |
| 2,655,473 | 10/1953 | Lowenheim | 204/213 X |
| 3,282,819 | 11/1966 | Hovanic | 204/213 X |
| 3,344,817 | 10/1967 | Connard | 204/213 X |
| 3,977,937 | 8/1976 | Candor | 204/180 R X |
| 3,977,951 | 8/1976 | Lopez-Cacicedo | 204/149 |
| 4,033,841 | 7/1977 | Candor | 204/180 R |

*Primary Examiner*—Arthur C. Prescott
*Attorney, Agent, or Firm*—Gersten Sadowsky; Donald A. Gardiner

[57] ABSTRACT

A system for the continuous dielectrophoretic separation of mixtures of particulate and granular materials by passing the materials through a divergent electric field created in a fluid dielectric medium by applying a voltage to an electrode configuration including a rotatable cylindrical-shaped electrode having a non-uniform conductor surface and a stationary perforate electrode spaced therefrom to define a contact zone. The particles having dielectric constants lower than that of the fluid medium are collected through the perforate electrode while those particles having dielectric constants higher than that of the fluid medium are attached to and separated by the rotatable electrode.

8 Claims, 2 Drawing Figures

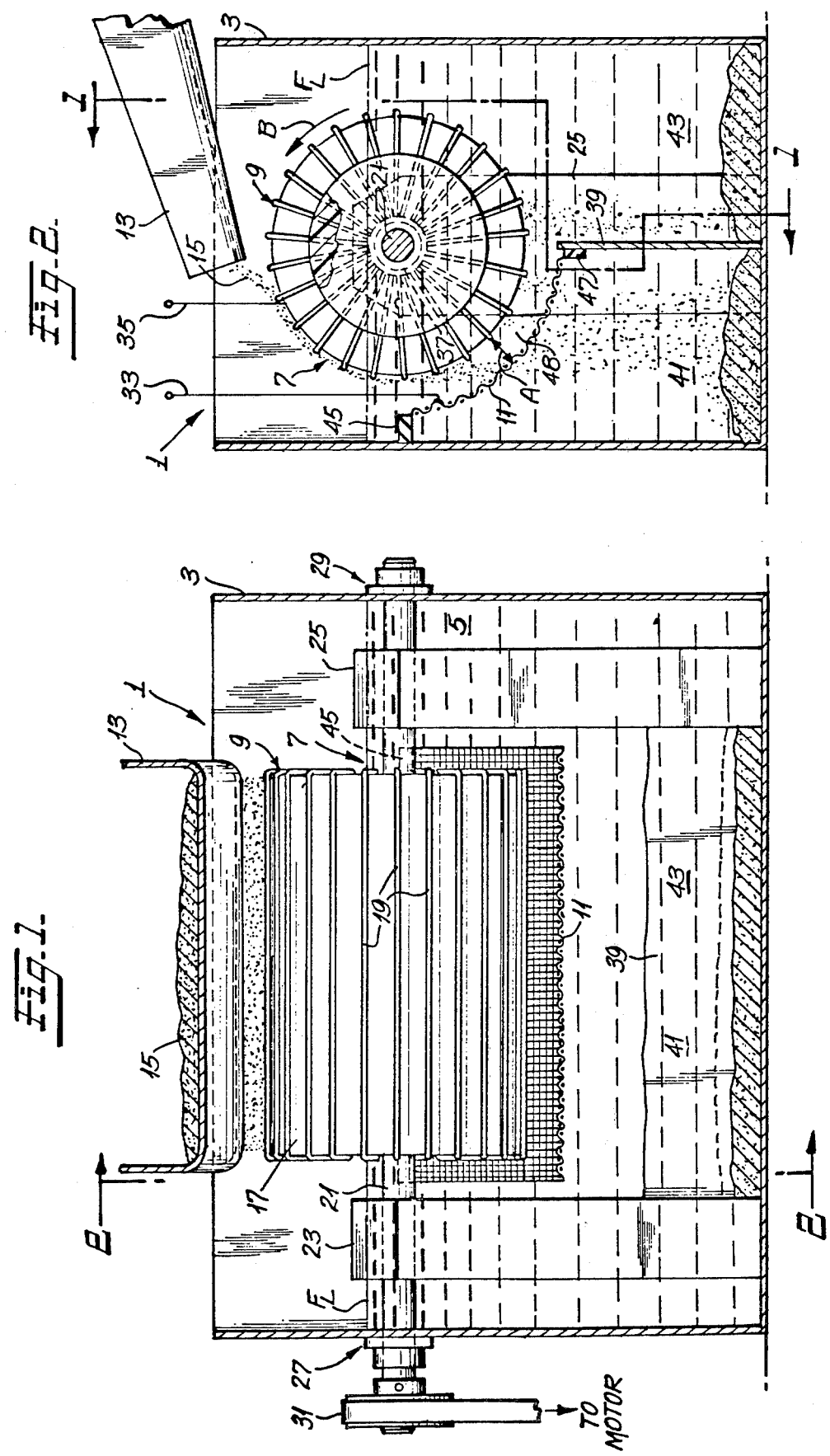

SYSTEM FOR THE DIELECTROPHORETIC SEPARATION OF PARTICULATE AND GRANULAR MATERIALS

This is a division of application Ser. No. 759,202, filed on Jan. 13, 1977.

BACKGROUND OF THE INVENTION

1. Field of the Invention

The invention generally relates to the separation of particulate materials including minerals, ores, industrial wastes and the like. More particularly, the invention deals with the separation of particulate and granular materials by utilizing a divergent electric field which effects the separation in accordance with the values of the dielectric constants of the materials being separated relative to the dielectric constant of a liquid dielectric medium within which the separation occurs.

2. Description of the Prior Art

The prior art recognizes that separation of various particulate materials in dry form or solids from liquids may be achieved by utilizing electrophoresis. Electrophoresis arises from the electrostatic attraction of charged electrodes for the charged particles. The direction of motion of the charged particles is dependent on the direction of the electric field, such that reversal of the field reverses the direction of travel. Electrostatic separation is generally conducted with air as the fluid dielectric medium within which two electrodes of opposite polarity are disposed. The high voltage electric field required to effect this type of separation is not necessarily divergent and, in most cases, is relatively uniform. It is generally accepted that optimum electrostatic separations are effected when the dielectric constant of the electrode gap be as near unity as possible.

The Tyson U.S. Pat. No. 2,485,335 is an example of a typical prior art system for separating materials by means of an electrostatic field. Tyson teaches that solid polymer particles may be separated from an associated reaction liquid by passing the slurry of liquid and particles through an electrostatic field created by an electrical discharge potential. The electrical discharge causes the polymer particles to adhere to the surface of the rotating drum which carries a charge opposite to that carried by the particles. The liquid is caused to drain away and the polymer particles adhering to the drum are subsequently removed therefrom.

By contrast, separation of materials through dielectrophoresis occurs because of the tendency of matter to become polarized in a non-uniform electric field and move into regions of highest field strength or intensity. Dielectrophoresis only occurs in a divergent or non-uniform electric field created in a fluid dielectric medium. In a divergent electric field, particles in a less-polar suspension migrate to and accumulate where the field is strongest. This movement does not require the particles to be charged but depends instead on the force experienced by all polarizable materials in non-uniform electric fields. The uncharged particle is believed to be polarized by the applied voltage and, consequently, moves due to the unequal pulls exerted by the forward and backward direction of the non-uniform electric field. The most polar material moves toward the area of greatest field intensity, independent of the direction of the field and the type of applied voltage, whether such voltage is in the form of alternating current, direct current or pulsating direct current. It is therefore recognized that for separation to occur, the dielectric constant of the particles to be separated must be higher than that of the liquid dielectric medium within which the divergent electric field is created.

The Walker U.S. Pat. No. 3,304,251 exemplifies a prior art system for separating particles by the utilization of dielectrophoresis or a non-uniform electric field. This is achieved by passing an inner wire electrode through an outer tubular electrode within which a contact zone is provided for the materials being separated. A liquid dispersion of the particles is contacted in the zone with a non-uniform electrical field such that the particles migrate and adhere to the wire electrode which removes the particles from the contact zone.

SUMMARY OF THE INVENTION

It is an object of the invention to provide a dielectrophoretic separation system which will continuously and efficiently separate a mixture of particulate materials by means of a divergent electric field.

It is another object of the invention to provide for a dielectrophoretic separator which is economical to construct and operate.

It is yet another object of the invention to provide for a dielectrophoretic separation system which is particularly useful for separating mixtures of minerals, ores, industrial wastes or other similar particulate and granular materials.

It is still a further object of the invention to provide for a dielectrophoretic separator having an electrode configuration which produces a strong divergent electric field and which configuration can be adapted to meet various degrees of separation capacity requirements.

The present invention achieves the foregoing objects by providing for an improved dielectrophoretic separation system which comprises a particular electrode configuration including a stationary perforate electrode and a rotatable cylindrical-shaped electrode spaced therefrom to define a contact zone. The electrode configuration is disposed within a vessel containing a liquid dielectric medium such that the perforate electrode is completely immersed within the medium while the rotatable electrode is only partially immersed therein. The rotatable electrode includes an insulated cylindrical support provided with a conductive wire grid formed from a plurality of longitudinal wires spaced around its outer peripheral surface. The stationary electrode includes an arcuate-shaped screen or similar perforate member which is spaced from and extends around a portion of the outer surface of the rotatable electrode. A suitable alternating or direct current voltage source applied to the electrode configuration causes a divergent electric field to be formed in the contact zone defined by the spacing between the perforate and rotatable electrodes. The particulate material to be separated is passed into this non-uniform electric field such that those particles having dielectric constants lower than that of the liquid dielectric medium are caused to fall through the perforate electrode and collect therebelow in a first collection area. Those particles having dielectric constants greater than that of the liquid dielectric medium are attracted toward the conductive wire grid on the rotatable electrode and are subsequently carried away from the electric field contact zone by the rotatable electrode and deposited into a separate second collection area.

Other objects, features and advantages of the present invention will be apparent from the following description of specific embodiments thereof, with reference to the accompanying drawings, which form a part of this specification, wherein like reference characters designate corresponding parts of the several views.

BRIEF DESCRIPTION OF THE DRAWINGS

FIG. 1 is a vertical sectional view of a separator of the present invention, taken along the line 1—1 of FIG. 2; and FIG. 2 is a transverse vertical sectional view, taken along the line 2—2 of FIG. 1.

DETAILED DESCRIPTION OF THE PREFERRED EMBODIMENTS

A dielectrophoretic separator 1 according to the present invention is depicted in FIG. 1. Separator 1 includes a vessel 3 for containing a volume of liquid dielectric medium 5. An electrode configuration 7 is disposed within liquid medium 5 and includes a rotatable cylindrical-shaped electrode 9 and a stationary perforate electrode 11. A hopper trough 13 is shown disposed above vessel 3 for the purpose of holding and feeding the mixture of particulate material 15 that is desired to be separated.

Rotatable electrode 9 includes a cylindrical-shaped insulated support 17 on which is provided a wire grid formed from a plurality of conductive wires 19 which are longitudinally disposed and circumferentially spaced about the outer peripheral surface of support 17. Electrode 9 is supported for rotation by means of a centrally disposed drive shaft 21 which in turn is supported within liquid medium 5 by means of trunnions 23 and 25. The ends of shaft 21 extend through and are rotatably supported within opposite wall sections of vessel 3 as indicated generally at 27 and 29. A belt and pulley assembly 31 may be utilized to connect shaft 21 to a motor (not shown) or any suitable mechanical or electrical power source for the purpose of rotating shaft 21.

Referring to FIG. 2, it is seen that electrode 11 is provided with a first electrical lead 33 and electrode 9 is provided with a second electrical lead 35 for the purpose of connecting to and receiving voltage from any suitable continuous voltage generator source (not shown). Such voltage source may be either alternating current, direct current or pulsating direct current. Electrical lead 35 is connected to a central conductor 37 to which all of wires 19 are conductively secured. Electrode 11 may be in the form of a conductive metal screen or other suitable conductive structure having perforations through which particles being separated may pass.

A baffle wall 39 is provided within vessel 3 for the purpose of dividing the lower interior portion thereof into two distinct collection areas 41 and 43. Wall 39 extends vertically from the bottom of vessel 3 and terminates below the lowermost portion of electrode 9. An insulating ledge 45 may be secured to an internal wall of vessel 3 and a cooperating insulating ledge 47 may be secured to the upper section of wall 39 for the purpose of supporting the outer longitudinal edges of electrode 11.

As seen in FIG. 2, electrode 11 is of an arcuate-shaped configuration which substantially conforms to the outer circumferential configuration of electrode 9. Electrode 11 is completely immersed within liquid medium 5 and extends around the lower portion of electrode 9 for approximately one-fourth of its total circumference. Electrode 9 is spaced from electrode 11 by a distance designated by A to thereby define a substantially constant width contact zone 48 through which the particles to be separated are passed. As also indicated, rotation of electrode 9 is in a direction designated by arrow B to define contact zone 48 by the lowermost quadrant of electrode 9 corresponding to the downward motion thereof.

The fluid level FL of liquid medium 5 is slightly above the central axis of rotation of electrode 9. Electrode 11 preferably extends longitudinally for approximately the same length as electrode 9 and transversely for approximately one-fourth of the total circumference of electrode 9. The disposition of hopper 13 is such that particulate material 15 fed into electrode configuration 7 to be separated falls upon and is carried downwardly into contact zone 48 by rotation of electrode 9.

The process by which a mixture of particulate materials is separated by separator 1 will now be described. Vessel S is filled with a dielectric medium up to the level indicated by FL. A suitable high voltage of alternating or direct current is applied to electrical leads 33 and 35 to thereby produce a strong divergent electric field in contact zone 48 defined by the spacing between electrodes 9 and 11. There are no polarity requirements in connector leads 33 and 35. Rotating electrode 9 is then caused to rotate in the direction of arrow B at a desired speed and particulate material 15 is continuously fed from hopper 13 onto electrode 9. Material 15 is brought down into liquid medium 5 and through contact zone 48. At this point, those particles having dielectric constants lower than that of liquid medium 5 will fall down and pass through perforate electrode 11 and into first collection area 41 for accumulation therein. Those particles having dielectric constants higher than that of liquid medium 5 will be attracted to wires 19 on electrode 9 and, upon continued rotation of electrode 9, will be brought out of the electric field in contact zone 48. Such particles are then released from wires 19 and fall downwardly on the other side of wall 39 into second collection area 43 for accumulation therein. In this manner, material 15 can be continuously fed into electrode configuration 7 wherein the desired particles may be separated quickly and efficiently.

Experimental testing and practice of the separation system of this invention have indicated several preferred parameters for the optimal operation of separator 1. It has been found that a preferred voltage range for electrode configuration 7 may be from approximately 200 to 15,000 volts, either alternating or direct current, with a voltage frequency ranging from about 0 to 10,000 hertz. Liquid dielectric medium 5 may possess a dielectric constant within the range of from about 2 to 81, depending on the materials being separated, and can include any known liquid medium suitable for this purpose, such as carbon tetrachloride and ethyl alcohol, carbon tetrachloride and methyl alcohol, zylol and ethyl alcohol or similar combinations. Wires 19 forming part of electrode 9 may be made of copper or any other suitable conductive metal well known in the art. Similarly, electrode 11 may be made of copper screen or other suitable conductive perforate structure. The particle size of the particulate materials being separated may be on the order of approximately −60 mesh to +400 mesh, with the lower limit being based upon a reasonable settling time of the particles in the liquid medium.

Because the actual separation process occurs in the planes perpendicular to the axis of rotation of electrode 9, the overall length of electrode configuration 7 is not restricted and may be adjusted according to the separation capacity desired.

In a specific example, a separator according to the invention was constructed wherein rotatable electrode 9 included a one-inch diameter insulated cylinder 17 upon which a series of parallel copper wires 19 were mounted on the peripheral surface thereof to form a conductive wire grid. Wires 19 were individually spaced one-eighth inch apart and disposed parallel to the longitudinal axis of cylinder 17. Electrode 11 was formed from a 60-mesh conductive wire screen shaped into a quarter cylinder section and disposed adjacent electrode 9 to define a spacing therewith having an arcuate configuration and a substantially constant one-eighth inch width. Because the curvature of electrode 11 substantially conformed to the circular configuration of electrode 9, the radius of the arc defined by electrode 11 was indicated as being one-eighth of an inch larger than the radius of electrode 9. This separator was supported within a vessel containing a liquid dielectric medium, with electrode 11 being completely immersed and electrode 9 being partially immersed with the liquid level about one-eighth inch above the axis of rotation of electrode 9. High voltage was then applied to the resulting electrode configuration 7 and a strong, divergent electric field was produced in the one-eighth inch spacing defining contact zone 48 for this separator.

Electrode 9 of this spearator was then rotated such that the downward motion side thereof was nearest to electrode 11 as it entered liquid medium 5. Particulate material 15 to be separated was then fed into electrode configuration 7 so that the electrode 9 continuously moved the material 15 into contact zone 48. Those particles having dielectric constants higher than that of the liquid medium were attracted to the wires 19 on electrode 9. The particles with dielectric constants lower than that of liquid medium 5 fell away from electrode 9 and passed downwardly through the perforations of electrode 11 and into first collection area 41. Continued rotation of the rotatable electrode caused the particles carried by wires 19 to be moved out of contact zone 48 which terminated substantially at the lower-most point of electrode 9. Once away from the effect of the divergent electric field in contact zone 48, the particles then began to immediately fall away from wires 19 and collected in second collection area 43 adjacent to and separated from first collection area 41 by baffle wall 39. As was therefore apparent, those particles having dielectric constants lower than that of liquid medium 5 were collected on the downward motion side of the electrode 9, while those particles having dielectric constants higher than that of liquid medium 5 were collected on the upward motion side of electrode 9.

The separation system of this invention is particularly useful in those industrial applications wherein mixtures of particulate materials and granular powders must be separated efficiently and quickly. Specific applications include the separation of various mineral resources and the beneficiating of ores and similar materials.

It is to be understood that the embodiments and forms of the invention herewith shown and described are to be taken as preferred examples of the same, and that various changes in the size, shape and arrangement of parts and parameters of operation may be resorted to, without departing from the spirit of the invention or scope of the sub-joined claims.

We claim:

1. A process for separating particulate and granular materials by dielectrophoresis wherein the materials are separated by a divergent electric field produced within a liquid dielectric medium, which process comprises:
   a. providing a contact zone defined by the space between a cylindrical-shaped rotatable electrode having a non-uniform conductor surface and an arcuate-shaped perforate electrode,
   b. applying a voltage to the electrodes to create a divergent electric field in the contact zone,
   c. passing the materials to be separated into the contact zone during rotation of the rotatable electrode,
   d. collecting the materials having dielectric constants lower than that of the liquid dielectric medium through the perforate electrode, and
   e. separating by attraction to the non-uniform conductor surface of the rotatable electrode those materials having dielectric constants higher than that of the liquid dielectric medium.

2. The process of claim 1 wherein the voltage applied to the electrodes to create the divergent electric field is within the range of from about 200 to 15,000 volts with a voltage frequency range of from about 0 to 10,000 hertz.

3. The process of claim 1 wherein the dielectric constant of the liquid medium is within the range of from about 2 to 81.

4. The process of claim 1 wherein the rotatable electrode is rotated at a speed of from about 1 to 50 revolutions per minute.

5. The process of claim 1 wherein the particle size of the materials being separated are within the range of from about −60 mesh to +400 mesh.

6. The process of claim 1 wherein the spacing between the rotatable electrode and the perforate electrode is about one-eighth inch.

7. The process of claim 1 wherein the non-uniform conductor surface is defined by a conductive wire grid.

8. The process of claim 7 wherein the conductive wire grid is formed from a plurality of conductive wires longitudinally disposed and spaced apart in a parallel fashion around the rotatable electrode.

* * * * *